United States Patent [19]
Nishikawa

[11] Patent Number: 4,516,440
[45] Date of Patent: May 14, 1985

[54] LOCKING MECHANISM FOR A TELESCOPIC STEERING WHEEL

[75] Inventor: Masumi Nishikawa, Toyoake, Japan

[73] Assignee: Aisin Seiki Kabushiki Kaisha, Kariya, Japan

[21] Appl. No.: 441,632

[22] Filed: Nov. 15, 1982

[30] Foreign Application Priority Data

Nov. 12, 1981 [JP] Japan .............. 56-167667[U]

[51] Int. Cl.³ ............................... B62D 1/18
[52] U.S. Cl. ........................ 74/493; 74/531; 74/533; 280/775; 403/109; 403/370
[58] Field of Search .......... 74/493, 531, 528, 533; 280/775; 403/109, 370

[56] References Cited

U.S. PATENT DOCUMENTS

| | | | |
|---|---|---|---|
| 2,792,719 | 5/1957 | Lanzone | 74/493 |
| 3,803,939 | 4/1974 | Schenten | 74/493 |
| 4,402,236 | 9/1983 | Nishikawa | 74/493 |

FOREIGN PATENT DOCUMENTS

| | | | |
|---|---|---|---|
| 632089 | 12/1927 | France | 74/533 |
| 55-156766 | 12/1980 | Japan | 74/493 |
| 540771 | 10/1941 | United Kingdom | 74/533 |

Primary Examiner—Allan D. Herrmann
Attorney, Agent, or Firm—Oblon, Fisher, Spivak, McClelland & Maier

[57] ABSTRACT

A locking mechanism for a telescopic steering wheel which includes a housing, an outer cylinder rotatably supported within the housing, a locking member slidably mounted within the outer cylinder, a steering shaft movably mounted within the outer cylinder, engaged with the locking member and operatively connected to the steering wheel, a locking rod rotatably mounted in the steering shaft and engaged with the locking member for attaining a locked or unlocked position of the locking member, a telescopic lever connected to the locking rod and movable between the locked and unlocked position and a mechanism for continuously urging the telescopic lever into the locked position.

5 Claims, 10 Drawing Figures

LOCKING MECHANISM FOR A TELESCOPIC STEERING WHEEL

BACKGROUND OF THE INVENTION

1. Field of the Invention

The present invention relates to a locking mechanism, and more particularly to a locking mechanism for a telescopic steering wheel.

2. Description of the Prior Art

In a conventional locking mechanism for a telescopic steering wheel, the forward and rearward moving function of the steering wheel is performed such that a telescopic lever is first actuated by releasing operation for releasing the locked state and a telescopic lever is manually actuated in a direction opposite to the releasing operation upon locking operation, namely the telescopic lever is locked by a manual tightening force. Accordingly, it is possible that the tightening force for the locking mechanism is insufficient and it is therefore possible that driving function is lost due to a sudden release of the locking mechanism. Moreover, if the tightening force for the locking mechanism is excessive, the locking mechanism will be damaged.

SUMMARY OF THE INVENTION

An object of the present invention is to provide an improved locking mechanism for a telescopic steering wheel which obviates the aforementioned drawbacks of the described conventional locking mechanism.

A further object of the present invention is to provide an improved locking mechanism for a telescopic steering wheel which can be reliably adjusted and locked in position.

A still further object of this invention is to provide an improved locking mechanism for a telescopic steering wheel which is relatively simple in construction and accordingly includes a minimum number of parts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
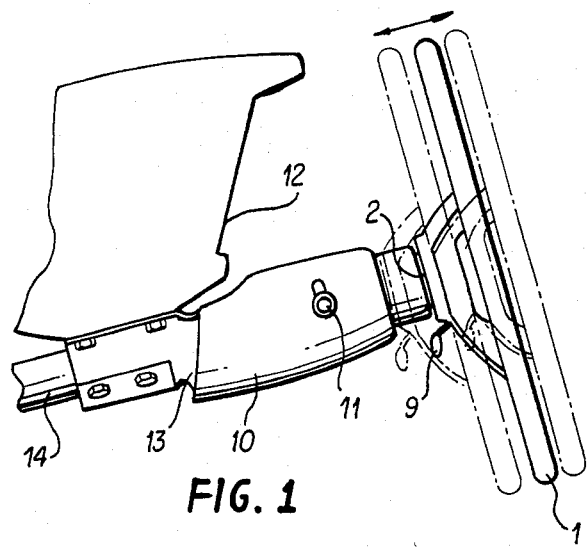
FIG. 1 is a side elevational view which shows a preferred embodiment of the locking mechanism for a telescopic steering wheel according to the present invention.
Figure 5:
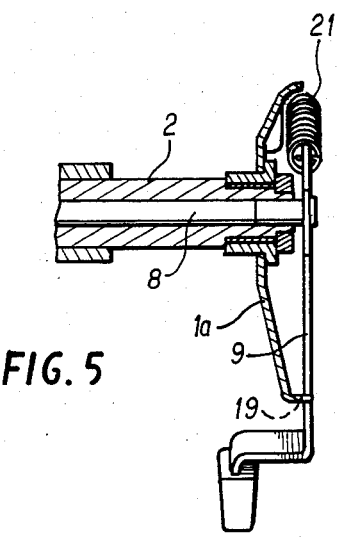
FIG. 5 is a sectional view taken along line V—V in FIG. 4.

Referring now to FIGS. 1–3 and 10, a steering wheel 1 is shown which can be expanded and contracted, that is, the steering wheel 1 is shifted forward and rearward so as to be expanded and contracted according to a physique of the driver and is locked at a suitable position. For attaining the function a steering shaft 2 fixed to the steering wheel 1 is forwardly or rearwardly movably mounted within an outer cylinder 5 which, in turn, is rotatably supported by a bearing 4 within a housing 3 and thereafter the outer cylinder 5 and the steering shaft 2 are locked together by a locking member 6.

The locking member 6 is engaged with the steering shaft 2 by means of a tapered portion thereof and is also engaged with a screw portion of a pointed end of a locking rod 8 rotatably inserted within steering shaft 2. The locking rod 8 is engaged with the steering shaft 2 through a screw 7 thereof. The locking member 6 is slidable in the direction of the steering wheel 1 according to the rotation of the locking rod 3 and the outer diameter of the locking member 6 is engaged with tapered portions of the steering shaft 2 and the locking member 6. Accordingly, the locking member 6 is operatively positioned on an inner cylindrical surface portion of the outer cylinder 5 and is locked so as to integrally rotate the steering shaft 2 and the outer cylinder 5.

Reference numeral 9 denotes a telescopic lever fixed to the locking rod 8. The housing 3 is enclosed within a column cover 10. Reference numeral 11 denotes a tilt lever for attaining the desired tilting position of the steering wheel 1. Reference numeral 12 indicates a dash board, 13 a bracket, 14 a column tube, 15 a joint member, 16 a joint shaft, 17 a toothed portion, and 18 an intermediate shaft.

Figure 4:
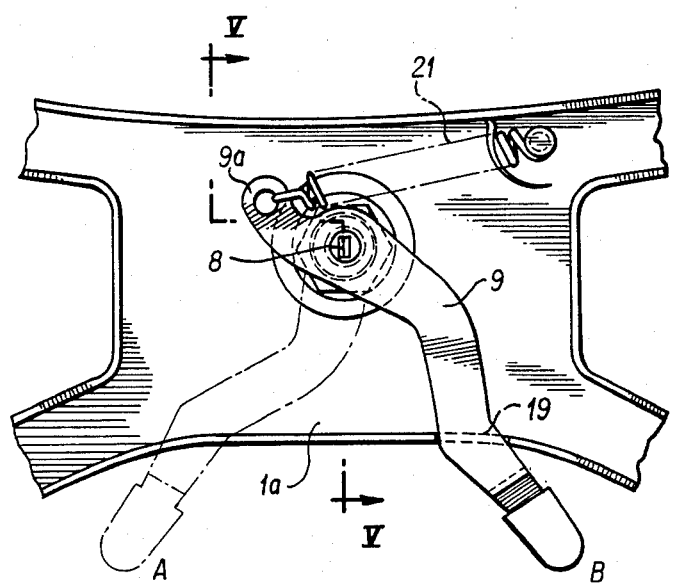
FIG. 4 is a front view which shows an attachment portion of the telescopic lever in FIG. 3.
Figure 2:
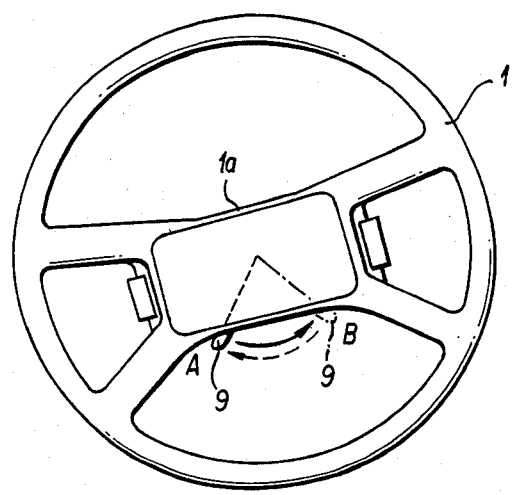
FIG. 2 is a front view of the telescopic steering wheel in FIG. 1.
Figure 6:
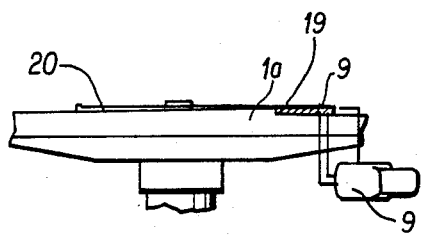
FIG. 6 is a bottom view of FIG. 4.

The telescopic lever 9 is slidable between a locked position A shown by a solid line and an unlocked position B shown by a chain and dotted line in FIGS. 2, 4. As viewed from FIG. 6, the telescopic lever 9 is engaged with a recessed portion 19 of a main body of the steering wheel 1 for maintaining the unlocked position B. The main body 1a of the steering wheel 1 is provided with a tapered portion 20 which is inclined in the direction of the locked position A for obtaining smooth movement of the telescopic lever 9. An intermediate portion of the telescopic lever 9 is connected to the locking rod 8 within the main body 1a of the steering wheel 1. One end of a spring 21, the other end of which is attached to the main body 1a of the steering wheel 1, is operatively connected to an end portion 9a of the telescopic lever 9.

The telescopic lever 9 is movable against the biasing force of the spring 21 upon movement in the direction of the unlocked position B and is automatically rotatably moved due to the urging force of the spring 21 upon movement into the locked position A. The telescopic lever 9 is engaged with a recessed portion 19 during the state of the unlocked position B for maintaining such position. When the steering wheel 1 is adjusted in the unlocked state, the telescopic lever 9 is prevented due to the urging force of the spring 21 from automatic movement into the locked position A, so that the adjusting operation is simplified.

In the situation where the telescopic lever 9 is released from the recessed portion 19 by moving the lever 9 after movement of the steering wheel 1 into the desired position, the telescopic lever 9 is automatically moved into the locked position A due to the urging force of the spring 21, so that the steering shaft 2 is locked to the outer cylinder 5 by a predetermined locking force.

Figure 7:
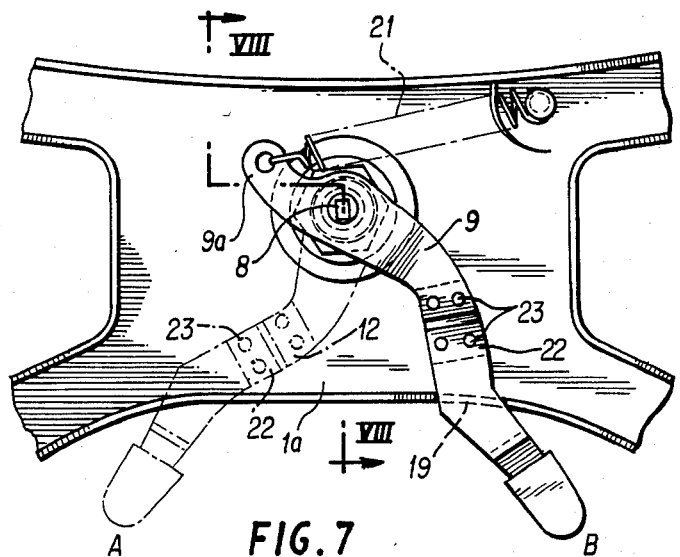
FIG. 7 is a front view which shows an attachment portion of a telescopic lever, but illustrating a different embodiment from the one shown in FIG. 4.
Figure 3:
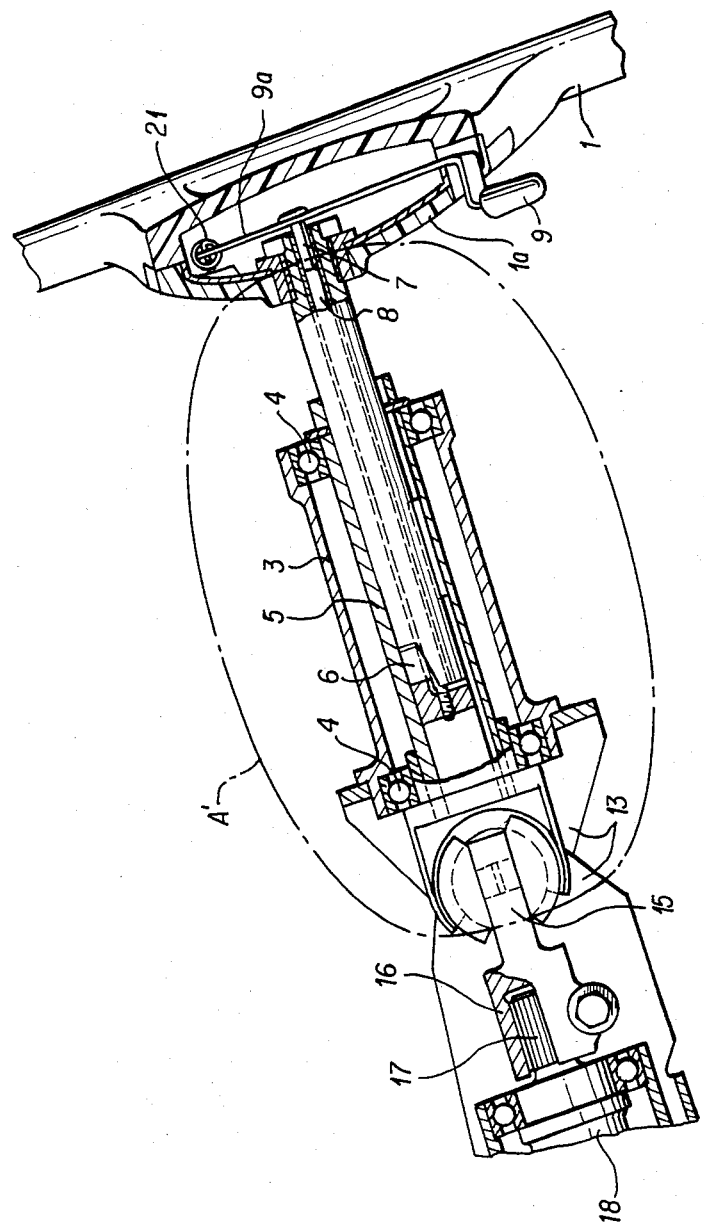
FIG. 3 is an enlarged side sectional view which shows the embodiment excluding the column cover in FIG. 1.
Figure 10:
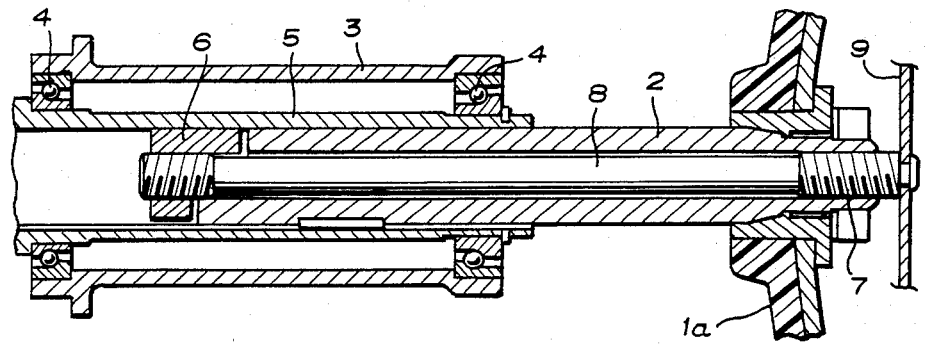
FIG. 10 shows an enlarged view of the elements of FIG. 3 lying within area A'.
Figure 8:
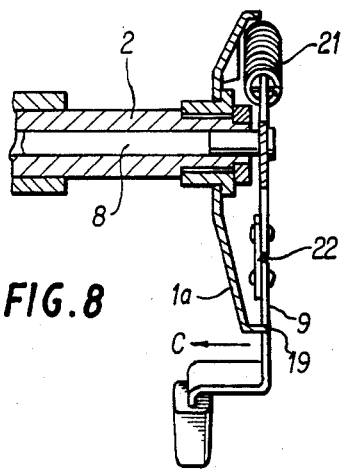
FIG. 8 is a sectional view taken along VIII—VIII in FIG. 7.
Figure 9:
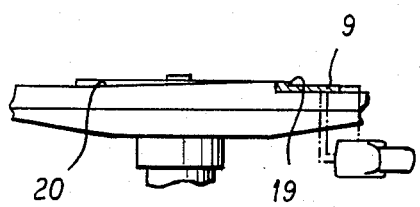
FIG. 9 is a bottom view of FIG. 7.

In FIGS. 7, 8, 9, a plate spring 22 is fixed nearly on a central portion of the telescopic lever 9 by means of a plurality of rivets 23. The telescopic lever 9 is urged by the plate spring 22 so as to move the lever 9 on an incline in the direction C in FIG. 8 so that the locking lever 9 is reliably engaged with the recessed portion 19 of the main body 1a of the steering wheel 1 and is easily released therefrom.

The operation according to the invention is as follows:

If the driver wishes to adjust the steering wheel 1 forwardly or rearwardly according to the physique of the driver, the telescopic lever 9 is engaged with the recessed portion 19 of the main body 1a of the steering wheel 1 by moving the lever 9 from the locked position A to the unlocked position B against the biasing force of the spring 21. The locking rod 8 is rotated according to movement of the telescopic lever 9 and the locking force between the steering shaft 2 and the outer cylinder 5 by the locking member 6 is discontinued. Accordingly, the steering shaft can be shifted forwardly and rearwardly within the outer cylinder 5.

If the engagement between the telescopic lever 9 and the main body 1a of the steering wheel 1 is manually released after the forward or rearward adjustment of the steering wheel 1, the telescopic lever 9 is automatically returned to the locked position A by the biasing force of the spring 21. The locking rod 8 is rotated in the opposite direction to the aforementioned unlocked state by return of the telescopic lever 9 and the locking member 6 is expanded so that the steering shaft 2 and the outer cylinder 5 are locked.

By the foregoing, there has been disclosed a preferred form of a locking mechanism for a telescopic steering wheel constructed in accordance with the present invention. It will be appreciated that various additions, substitutions, modifications and omissions may be made thereto without departing from the spirit of the invention.

What is claimed as new and desired to be secured by Letters Patent of the United States is:

1. A locking mechanism for a telescopic steering wheel comprising:
    a housing;
    an outer cylinder rotatably supported within said housing;
    a locking member slidably mounted within said outer cylinder;
    a steering shaft movably mounted within said outer cylinder, engaged with said locking member and operatively connected to said steering wheel;
    a locking rod rotatably mounted in said steering shaft and engaged with said locking member for attaining a locked or unlocked position of said locking member;
    a telescopic lever connected to said locking rod and movable between said locked and unlocked position;
    spring means for continuously urging said telescopic lever into said locked position; and
    recessed means formed on a main body portion of said steering wheel for engaging said telescopic lever thereon in said unlocked position.

2. A locking mechanism for a telescopic steering wheel as set forth in claim 1, wherein said main body portion has a portion extending along said telescopic lever and said recessed portion is formed on said extended portion of said main body portion.

3. A locking mechanism for a telescopic steering wheel comprising:
    a housing;
    an outer cylinder rotatably supported within said housing;
    a locking member slidably mounted within said outer cylinder;
    a steering shaft movably mounted within said outer cylinder, engaged with said locking member and operatively connected to said steering wheel;
    a locking rod rotatably mounted in said steering shaft and engaged with said locking member for attaining a locked or unlocked position of said locking member;
    a telescopic lever connected to said locking rod and movable between said locked and unlocked position;
    means for continuously urging said telescopic lever into said locked position; and
    means formed on a main body portion of said steering wheel for engaging said telescopic lever thereon in said unlocked position wherein said means for engaging said telescopic lever further comprises a tapered portion of said main body which is inclined in the direction of the locked position.

4. A locking member for a telescopic steering wheel as set forth in claim 1 further comprising spring means fixed on said telescopic lever so as to bias said telescopic lever in a direction of engagement with a main body portion of said steering wheel.

5. A locking member for a telescopic steering wheel as set forth in claim 4, wherein said spring means further comprises a plate spring.

* * * * *